June 28, 1966  A. T. FORRESTER  3,258,597
LASER HETERODYNE COMMUNICATION SYSTEM
Filed May 1, 1964  2 Sheets-Sheet 1

INVENTOR.
ALVIN T. FORRESTER
BY
Attorneys

United States Patent Office 3,258,597
Patented June 28, 1966

3,258,597
LASER HETERODYNE COMMUNICATION SYSTEM
Alvin T. Forrester, Los Angeles, Calif., assignor to Electro-Optical Systems, Inc., Pasadena, Calif.
Filed May 1, 1964, Ser. No. 365,236
3 Claims. (Cl. 250—199)

The present invention relates to the optical arts in general and more particularly relates to apparatus for mixing or beating two different light waves.

This application is a continuation-in-part of the original application filed February 27, 1961, and given Serial No. 91,706, now abandoned.

Certain widespread misconceptions concerning the nature of light, from the classical point of view, seem to have their origin in a rather loose useage of the term coherence and, therefore, it would be profitable to begin this discussion with a definition. Thus, two waves will be said to be coherent if there exists a correlation between their phases. Specifically, two waves are perfectly coherent if the phases of the two bear a definite relationship to each other, slightly coherent if there exists a small correlation between their phases, and incoherent only if the phase variations in each wave occur completely independently of what is happening in the other wave. Thus, one can speak of the two beams of light in a Michelson interferometer as being coherent, or of induced radiation as being coherent with the inducing radiation. However, it is not necessary that two waves have the same frequency to be coherent. A light wave and its reflection from a moving mirror, and two radio waves whose frequency difference is controlled by a signal obtained by beating them together are examples of coherent pairs of different frequencies.

With respect to incoherent light waves, it was very logically argued in the past that interference or, stated differently, a heterodyning action, could not be obtained between incoherent light waves and it was so stated in several physics texts. To explain this point of view, it was argued that interference was in fact obtained instantaneously, that is, at any one instant, but that it shifted around or varied timewise and spacewise and hence was cancelled out, that is to say, no stationary interference pattern was developed. The present invention overturns this earlier theory and involves the discovery that incoherent light waves can be made to interfere or mix, providing certain operating conditions are maintained.

More particularly, it is the basic concept of the present invention that if two incoherent beams of light are applied to a non-linear detection device, with the beams approaching the detector device over the same or substantially the same paths and overlapping each other on the surface of incidence, then a mixing action will be observed and an intermediate-frequency output signal thereby obtained. With respect to the non-linear detector, a photo-electric device would be used since the electron emission from the photo-surface thereof would correspond to the square of the amplitude of the input signals which, in this case, would be the intensity of the incident light beams. With respect to the requirement that the light beams follow substantially parallel paths on approaching the detecting device, mirrors and other optical elements can be used to accomplish this result. In the event one of the light sources is moving and thereby changing its position relative to the rest of the system, then a tracking arrangement can be used in combination with the above said mirrors and optical elements to make both beams substantially follow the same path. As for the requirement that the beams overlap on the surface of the photo-electric device, this requirement can be met with the aid of a system of lenses.

The ability to mix or beat light waves from two different sources and that are incoherent with respect to each other opens up new possibilities in the fields of communications and scientific investigation. Thus, by way of example, it opens the door to the simple and effective modulation and demodulation of light beams, such as laser beams. Again, it permits intermediate-frequency signals in the radio and microwave ranges to be obtained which, in turn, permits existing receiver equipment to be adapted for use. Scientifically speaking, the present invention also provides means by which to obtain information about spectral line widths, line shapes or frequency shifts without the use of complex optical instruments.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 3b is a plot of the modulation envelope of the electric field variation in FIGURE 3a;

Figure 4:
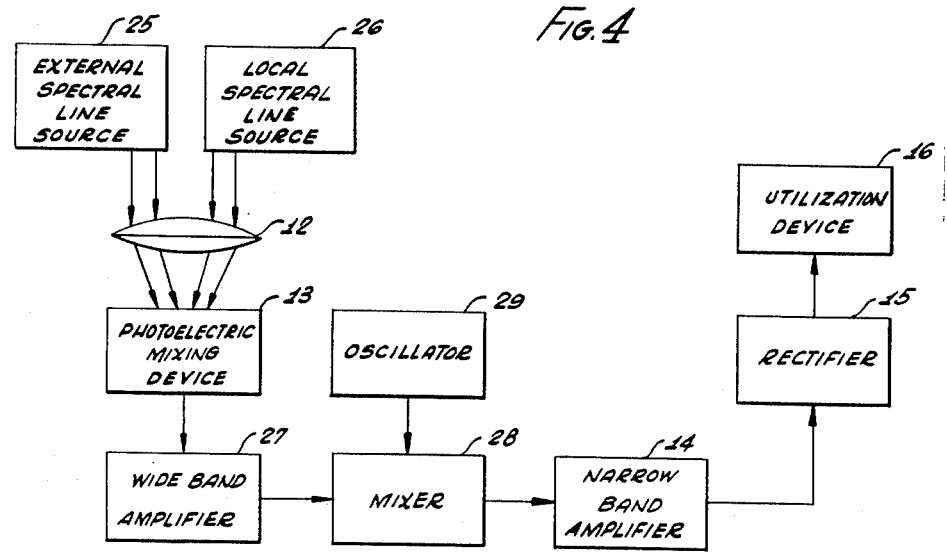
Figure 5:
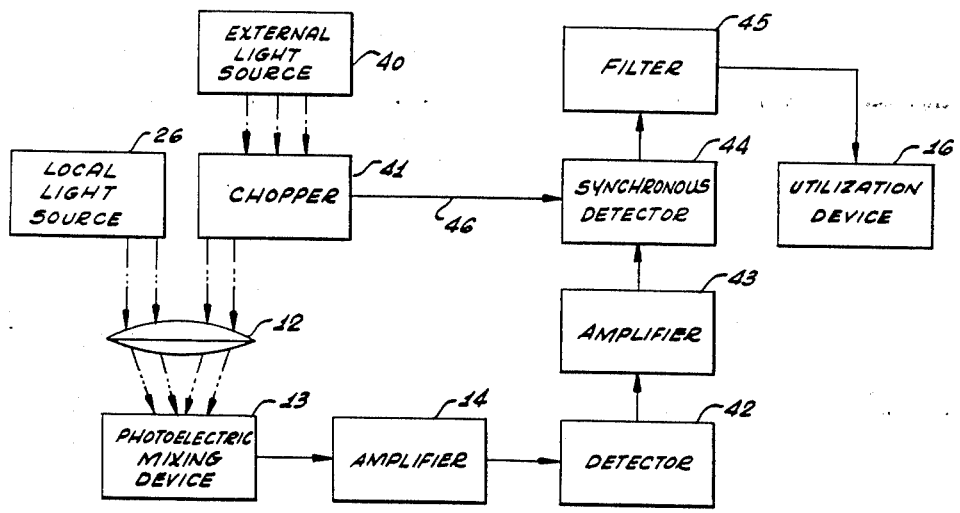

FIGURE 4 is a block diagram of a modification of an electro-optical system in accordance with my invention, showing the photoelectric mixing device receiving light from local and external sources and arranged to have its output mixed with the output of an oscillator, and showing how the output of the mixer is amplified and rectified for utilization purposes; and FIGURE 5 is a block diagram of a further modification of an electro-optical system of my invention, showing how a line from an external source is chopped and then mixed with the light from a local source in a photoelectric mixing device, and showing a synchronous detector arrangement for developing an output only in coincidence with the operation of the chopper, whereby to develop an output wherein the chopped light signal is rendered detectable despite the presence of relatively large shot noise or other noise originating in the photoelectric mixing device or amplifier.

Figure 1:
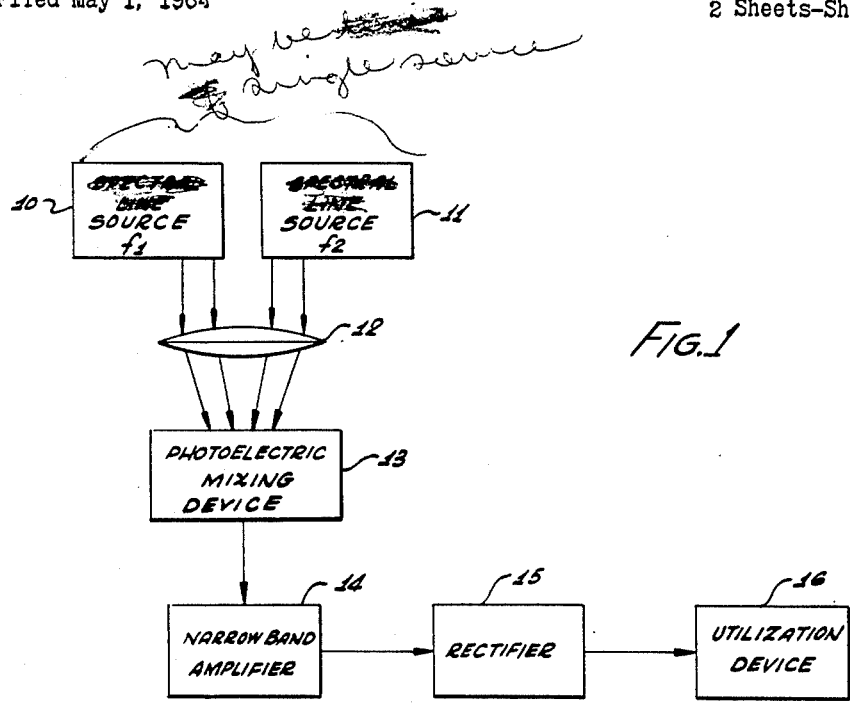
FIGURE 1 is a block diagram of an electro-optical system in accordance with my invention, showing how spectral lines from different sources or set of atoms are focused on a photoelectric device for mixing, and showing how the output of the photoelectric device is amplified and rectified for deriving information about the spectral line sources.

Referring to FIGURE 1, there is shown a pair of spectral line sources 10, 11 that emit light waves at respective frequencies $f_1$, $f_2$. "Light waves" as used herein means means any portion of the electromagnetic spectrum capable of producing a photoelectric effect. The outputs of the sources 10, 11 are directed through a focusing lens 12 to be concentrated on a small spot on the photosensitive element of a photoelectric mixing device 13. The photoelectric mixing device 13 in effect mixes the outputs of the sources 10, 11 to develop an output voltage having an A.-C. component that varies as the difference frequency, i.e., $f_2 - f_1$. It must be emphasized that in order for this to happen, the light waves must reach the photoelectric mixer through paths that are substantially identical optically, by which is meant that the beams must follow substantially parallel paths in arriving at the photoelectric device. The reason for this is that the phase relationships are different where the beams approach from different angles, a sinusoidal type of variation developing over the surface of the photoelectric device as a result. Consequently, there is a substantial cancellation of the output if the angles of incidence of the two beams differ widely.

It must also be emphasized that the beams must overlap at the time they strike the surface of the photoelectric device, which was what was meant above when it was stated that the beams are concentrated on a small spot. Thus, unless there is an overlapping of the beams on an area of the surface of the photoelectric device, there would be no intermediate-frequency signal developed, that is to say, no signal having frequency $f_2-f_1$. Instead, there would only be D.C. or noise signals at the device's output. Finally, it must be emphasized that in order for the present invention to work it must utilize a photoelectric device as the mixer, such as a photoelectric cell, a photoconductor, or a photovoltaic cell. The reason for this is that these devices have non-linear detection characteristics associated with them, which is what is required herein order to produce the desired IF output.

Thus, by way of summary, three basic conditions must be met, if the present invention is to operate properly. First, the beams must arrive at the mixer device over substantially identical paths; second, the beams must overlap on an area of the photosensitive surface; and, third, the mixer must be a photoelectric device because of its non-linear detection characteristics.

The photoelectric mixing device 13 is coupled to a narrow-band amplifier 14, which is adapted to pass the relatively low frequency A.-C. component in the output of the photoelectric device. In this connection, the difference frequency, $f_2-f_1$, is sufficiently low that it can be accommodated by a conventional type narrow-band amplifier. A rectifier 15 is coupled to the output of the amplifier, and the detected output of the rectifier 15 is applied to a utilization device 16 which, for example, may include an indicator.

As will be recognized, the above-described arrangement and operation of the photoelectric mixing device 13 is a marked departure from the traditional use to which a photoelectric pickup device is put. Conventionally, such a device is utilized to develop a D.-C. output, the magnitude of which is proportional to the intensity of the incident radiation on the photo-sensitive surface. However, I have found that by applying two incoherent spectral lines of great intensity and very narrow bandwidth to its photo-sensitive surface, a photoelectric device develops an output that includes a useful A.-C. component that varies as the beat frequency of the incoherent light waves.

Figure 2:
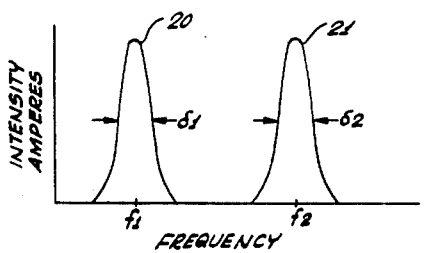
FIGURE 2 is a graph showing the plot of intensity versus frequency for different spectral lines, to aid in explaining the photo-mixing utilized in my invention.

To aid in understanding the foregoing, reference will be made to FIGURES 2, 3a and 3b. In FIGURE 2, there is shown a pair of sharp spectral lines 20, 21 at frequencies $f_1$, $f_2$. These two lines will generally be incoherent. The term incoherent here does not relate to the spectral widths of the individual lines or the degree of randomness in the fields of each line, as the term is occasionally but erroneously used, but merely to the fact that phase changes within each spectral line occur in a manner unrelated to the phase changes occurring in the other spectral line, and limited only by the frequency width of each line.

The lines 20, 21 have finite widths $\delta_1$ and $\delta_2$, which can arise in many ways, e.g., as a natural width, or from Doppler broadening. Whatever the source of broadening, the spectral line curve may be thought of as a plot of the squares of the amplitudes of the Fourier components of the electromagnetic field, which is the light. The combination of the two lines 20, 21 results in beats between all of the Fourier components of one line and all of the Fourier components of the other line.

Figure 3A:
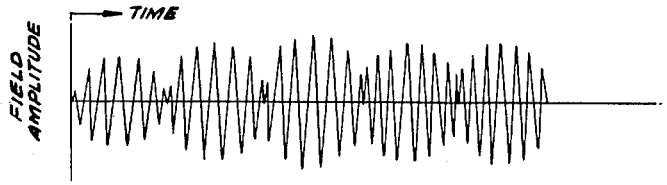
FIGURE 3a is a plot of voltage versus time showing the electric field variation at an elemental photo-cathode area due to an admixture of two spectral lines of equal intensity.

The variation in amplitude with time as shown in FIGURE 3a, where the effect of a line width which is not negligible, is displayed by irregularities in the wave envelope. The beat frequencies will vary approximately from $f_2-f_1-\delta$ to $f_2-f_1+\delta$ but will nevertheless be a well defined beat pattern provided that the coherence time $1/\delta$, is long compared to the beat period, $1/(f_2-f_1)$, i.e., $$f_2-f_1 \gg \delta \qquad (1)$$

When the spectral lines 20, 21 impinge upon the photosensitive surface of a photoelectric device, the relative phase of each of the light waves, and therefore, the phase of the beats, is constant over an elementary area of the photo-sensitive surface of the order of the size of the diffraction pattern of a single point on the source, i.e., $\lambda^2/\Omega$, where $\Omega$ is the solid angular spread in the light at each point of the photo-cathode. This is an area of coherence, i.e., where the phases of the waves at times bear a definite relationship to each other, and the photocurrent from the area of coherence is nearly 100% modulated (see FIGURE 3a). From this area the average peak value of the A.-C. current, at the beat frequency, is equal to the overage or D.-C. current, so that the mean square value of the A.-C. current from this elementary area is $$\langle i_0^2 \rangle = \frac{1}{2}\left(\frac{I\lambda^2}{A\Omega}\right)^2 \qquad (2)$$

where I is the total photocurrent from a cathode of total area A.

Considering that the signal from each area of coherence is randomly phased with respect to all other areas of coherence, the mean square current for the entire photo-cathode is derived by considering the number of times the area of coherence goes into the entire cathode area, viz., $$\langle i^2 \rangle = \langle i_0^2 \rangle \frac{A\Omega}{\lambda^2} = \frac{I^2\lambda^2}{2A\Omega} \qquad (3)$$

Figure 3B:
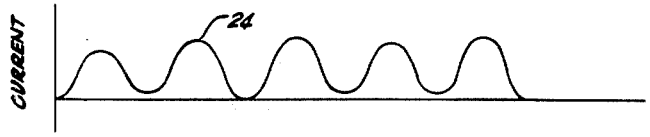

Referring to FIGURES 1 and 3b, the modulation above-described results in an output current 24 from the rectifier 15 that fluctuates at a frequency $f_2-f_1$. And such frequency is in a range that circuits of conventional design are adapted to handle. For example, although frequencies $f_1$, $f_2$ are in the photoelectric spectrum, their difference may be a frequency in the megacycle range well within the limits of present-day amplifier and rectifier circuits.

The detectability of the signal given by Equation 3 depends on a comparison between the signal strength and shot noise given by the usual expression.

$$\langle i_n^2 \rangle = 2eI\Delta f \qquad (4)$$

where e is the electronic charge, and $\Delta f$ is the acceptance band-width. The beat signals are spread out over a band of frequencies of width $\delta$, neglecting numerical factors of the order of unity. For a proper comparison, $\Delta f$ should be set equal to the same band-width, leading to a signal-to-noise ratio $$\frac{\langle i^2 \rangle}{\langle i_n^2 \rangle} = \frac{1}{4e}\frac{I\lambda^2}{4\Omega\delta} \qquad (5)$$

For usual light intensities the value of $(I\lambda^2/A\Omega\delta)$ leads to very small values of the signal-to-noise ratio. Under certain conditions, light sources of the type known as optical masers, or lasers, generate light for which the values of the signal-to-noise ratio may be very large. With such light sources, the photoelectric mixing is especially valuable.

FIGURE 4 illustrates an electro-optical system of my invention for detecting and utilizing the characteristics of an external spectral line source 25. In this system, as before, a local spectral line source 26 and the external source 25 are adapted to have their outputs follow substantially identical paths and then focused onto the same area on the photo-sensitive surface of the photoelectric mixing device 13. A wide band amplifier 27 is connected to the output of the photoelectric mixing device 13, and the output of the amplifier 27 is applied to a mixer 28 along with the output of an oscillator 29.

Thus, the output of the photoelectric mixing device 13 is heterodyned, to obtain an output from the mixer 28 that is the beat frequency of the outputs of the oscillator 29 and the photoelectric mixing device 13. The narrow band amplifier 14, in this case, is adapted to pass a narrow band of frequencies in a much lower range than in the system of FIGURE 1.

FIGURE 5 illustrates a unique system of my invention that is particularly well suited for deriving information about or from a distant light source, represented as an external light source 40. In this system, the light output of the source 40 is chopped at some low frequency, e.g., thirty cycles per second, as by a chopper device 41. The light passing through the chopper passes through the lens 12, along with the light output of the local light source 26, to be focused in the same manner on the photo-sensitive surface of the photoelectric mixing device 13.

As shown, the signal from the photoelectric mixing device 13 is fed through the amplifier 14 to be detected by a detector 42, and the detected signal is amplified, by a narrow band amplifier 43, and applied to a synchronous detector 44. The output of the synchronous detector 44 is filtered by a filter 45 and applied to the utilization device 16.

The system of FIGURE 5 allows extremely weak radiations from a very distant source to be detected. To understand the difficulties involved, it should be noted that for intense radiations incident on the photo-sensitive surface, the accompanying shot noise is unavoidably high. Such shot noise would completely mask a very weak incident radiation such as would be received if the external light source 40 were many miles distant.

By imposing a low frequency modulation on the light from the external source 40, as by the chopper 41, the weak light signal is modulated while the light from the local source 26 and the accompanying shot noise are not so modulated. Accordingly, the output of the photoelectric mixing device 13 is a signal of the difference frequency of the light waves from the sources 25, 40 modulated by the low chopper frequency.

The amplifier 43 preferably is a very narrow band amplifier, adapted to pass the fluctuations from the output of the detector 42 that are of the low chopper frequency. The synchronous detector 44 is operated in synchronism with the chopper 41, as through a connection 46, so as to develop an output that is exactly in phase with the low modulation frequency. In this manner, the output of the synchronous detector 44 is made to accurately indicate the magnitude of the incident radiation from the external source 40.

The mixing and detection scheme of my invention is particularly advantageous for mixing the outputs of two lasers, whether they are different or identical. As will be apparent, identical lasers may be located on spaced relatively movable objects, e.g., a ground station and a moving satellite, and my invention is operable to measure relative frequency or phase shifts between the lasers due to velocity, acceleration or gravitational effects.

It will be apparent that my invention is adapted to develop information about or from any light waves of different frequencies. In this connection, it should be noted that the shape of a single spectral line may be determined through the differences in frequencies within the envelope of a single line, e.g., the sources 10, 11 in FIGURE 1 may be combined, i.e., be a single source. In other words, my invention is applicable to a single source emitting two spectral lines, or a single line having a range of frequencies. Further, although I have illustrated and described certain embodiments of my invention, it will be apparent that various modifications can be made without departing from the spirit and scope of my invention. For example, my invention embraces the use of preamplification prior to focusing light on the photo-sensitive surface of the photoelectric mixing device, as with a laser amplifier. Accordingly, I do not intend that my invention shall be limited, except as by the appended claims.

Having thus described the invention, what is claimed is:

1. Apparatus for optically communicating between two points, said apparatus comprising: means at one point for transmitting a modulated first laser beam to the other point; and a receiver system at said other point for extracting the modulation content from said modulated first laser beam, said receiving system including light-source means for producing an unmodulated second laser beam, a photoelectric device having non-linear detection characteristics, first means for directing said first and second laser beams toward said photoelectric device along substantially identical paths optically, and second means interposed between said first means and said photoelectric device for focusing said beams onto the same area of said photoelectric device to produce a correspondingly modulated intermediate-frequency signal whose frequency is the difference between the carrier frequency of said first laser beam and the generated frequency of said second laser beam.

2. Receiver apparatus for extracting information contained in a modulated laser light beam, said receiver apparatus comprising: input means for receiving the modulated laser light beam; local-oscillator means for generating an unmodulated narrow-band laser light beam; a photoelectric element for mixing said modulated and unmodulated laser beams to produce a correspondingly modulated intermediate-frequency signal; and means for producing a spot of light on said photoelectric element composed of said two beams, said means being adapted to project said two beams of light toward said photoelectric element through substantially identical optical paths.

3. A superheterodyne receiver for extracting information contained in a modulated laser light beam, said receiver comprising: a photoelectric device having non-linear detection characteristics; optical local-oscillator means for generating a narrow-band laser light beam, said local-oscillator means including additional means for projecting said narrow-band laser beam as a spot of light onto said photoelectric device; input means for receiving the modulated laser light beam from whatever direction and for projecting it onto the spot of light on said photoelectric device along a path that is substantially identical optically to that of the laser beam out of said local-oscillator means, whereby a correspondingly modulated intermediate-frequency signal is produced by said photoelectric device; and superheterodyne radio-frequency receiver apparatus for demodulating said intermediate-frequency signal.

References Cited by the Examiner

UNITED STATES PATENTS

| | | | |
|---|---|---|---|
| 2,265,784 | 12/1941 | Von Baeyer | 250—199 X |
| 2,710,559 | 6/1955 | Heitmuller et al. | |
| 2,929,922 | 3/1960 | Schawlow et al. | 250—199 |

FOREIGN PATENTS

| | | |
|---|---|---|
| 608,711 | 3/1962 | Belgium. |
| 197,782 | 5/1923 | Great Britain. |

OTHER REFERENCES

Forrester et al.: Physical Review, vol. 99, No. 6, Sept. 15, 1955, pp. 1691–1700–QCI–P4.

DAVID G. REDINBAUGH, *Primary Examiner.*

J. W. CALDWELL, *Assistant Examiner.*